US005542487A

United States Patent [19]

Schultz et al.

[11] Patent Number: 5,542,487

[45] Date of Patent: Aug. 6, 1996

[54] PORTABLE COMPACT MULTI-FUNCTION PRINTER WITH CARTRIDGE PAPER SUPPLY

[75] Inventors: Darald R. Schultz, Cedar Rapids; Richard A. Sherman, Toddville, both of Iowa

[73] Assignee: Norand Corporation, Cedar Rapids, Iowa

[21] Appl. No.: 392,275

[22] Filed: Feb. 22, 1995

Related U.S. Application Data

[63] Continuation of Ser. No. 86,340, Jul. 1, 1993.

[51] Int. Cl.[6] .......... H04L 15/34; G06F 17/00; G06F 15/12; G06K 7/10

[52] U.S. Cl. .......... 178/4.1 A; 178/4; 178/40; 235/375; 235/379; 235/432; 235/472

[58] Field of Search .......... 178/4, 4.1 A, 40; 235/375, 379, 432, 472

[56] References Cited

U.S. PATENT DOCUMENTS

| | | | |
|---|---|---|---|
| D. 334,208 | 3/1993 | Barbookles | D18/50 |
| 3,601,043 | 8/1971 | Cook | 101/90 |
| 4,371,948 | 2/1983 | Chadra | 364/900 |
| 4,745,265 | 5/1988 | Douno | 235/379 |
| 4,810,866 | 3/1989 | Lord | 235/379 |
| 5,053,607 | 10/1991 | Carlson et al. | 235/379 |
| 5,168,558 | 2/1993 | Sherman | 400/88 |
| 5,236,265 | 8/1993 | Saito | 400/88 |
| 5,294,782 | 3/1994 | Kumar | 235/472 |
| 5,310,997 | 5/1994 | Roach | 235/375 |

*Primary Examiner*—Stephen Chin
*Assistant Examiner*—Vijay Shankar
*Attorney, Agent, or Firm*—Simmons, Perrine, Albright & Ellwood, P.L.C.

[57] ABSTRACT

A data system includes a portable printer unit and a portable data collection terminal. The printer unit and the data collection terminal are communicatively coupled by a data link which may be a low power radio frequency data link, or it may be a standard communications cable. The portable printer unit is distinguished over other portable printers by, among other features, having the capability of printing a check routing data block in magnetic ink and in a manner which conforms to MICR (Magnetic Ink Character Recognition) standards. Coding and decoding of data may be provided based on printer unit or printer cartridge specific data which may be transmitted from the printer unit to the data collection terminal. The portable printer unit is also adapted to receive a paper supply from either a roll paper supply cartridge or a sheet paper supply cartridge, having the capability to distinguish between the two types of cartridges. Character printing may be either in transverse rows or in landscape type printing format.

4 Claims, 3 Drawing Sheets

Fig.1.
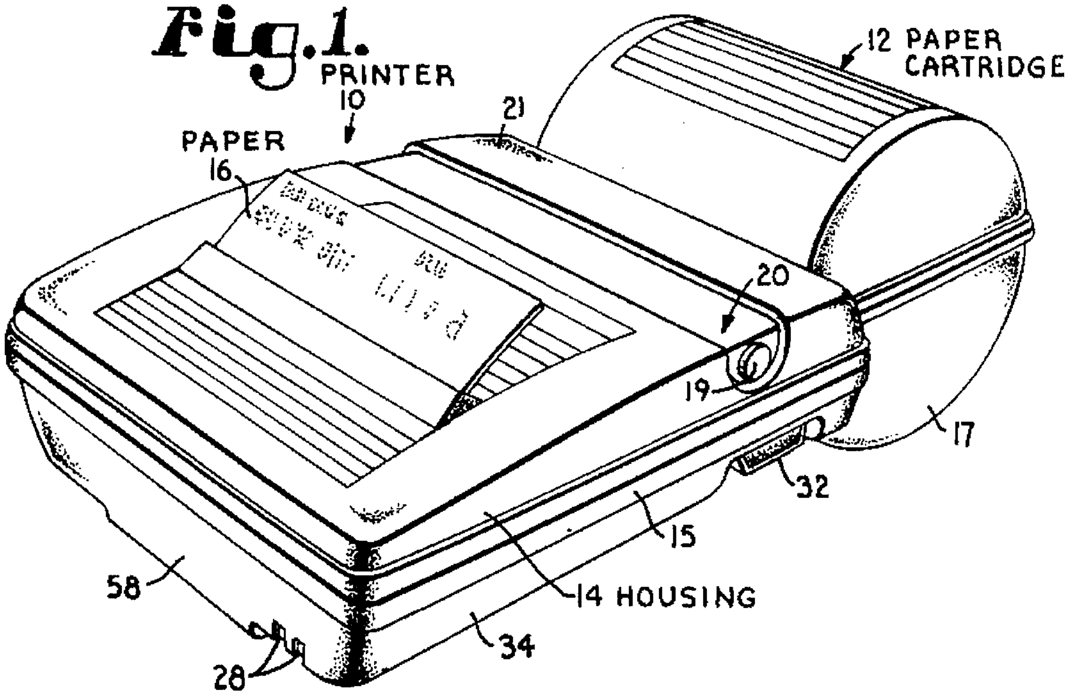
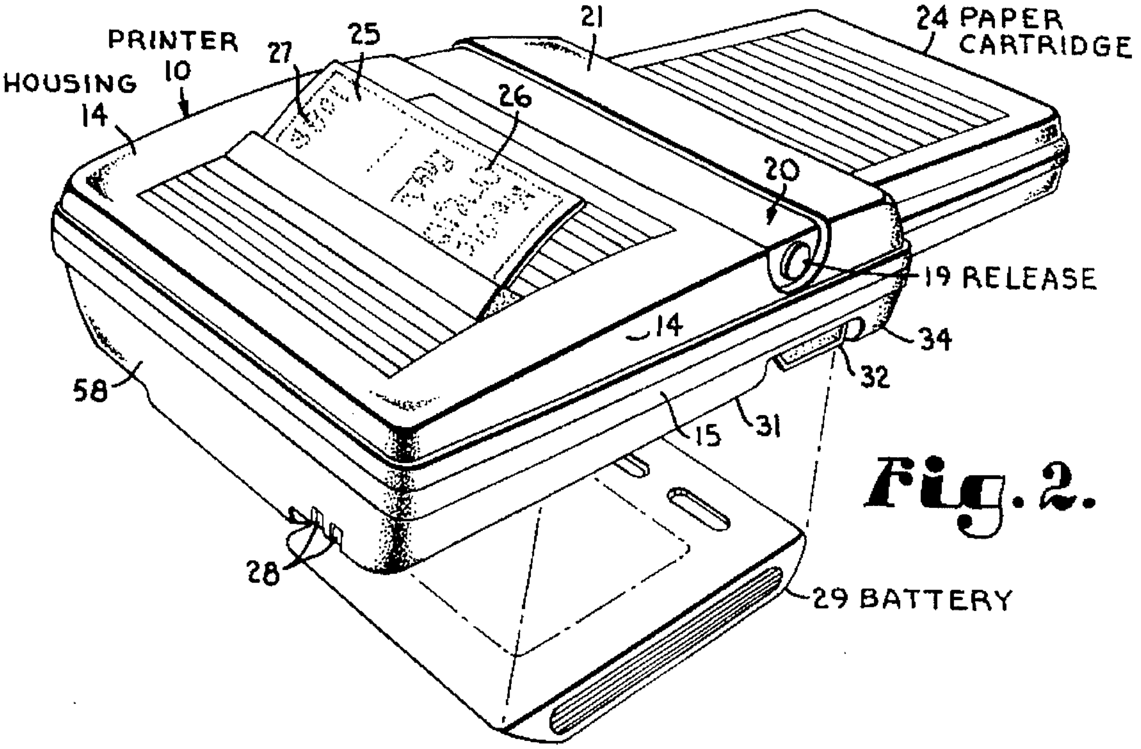
Fig.2.

Fig.3.
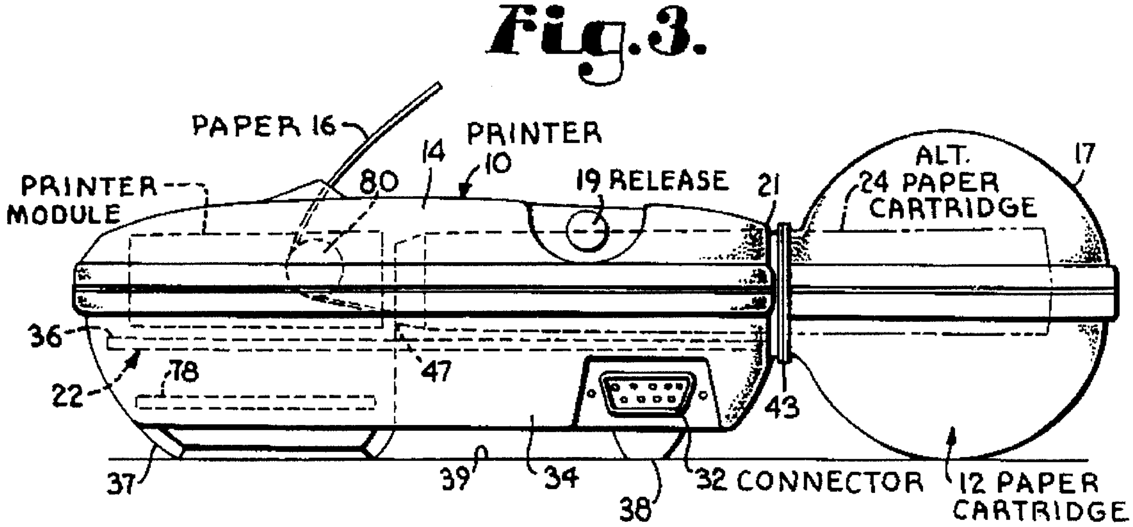
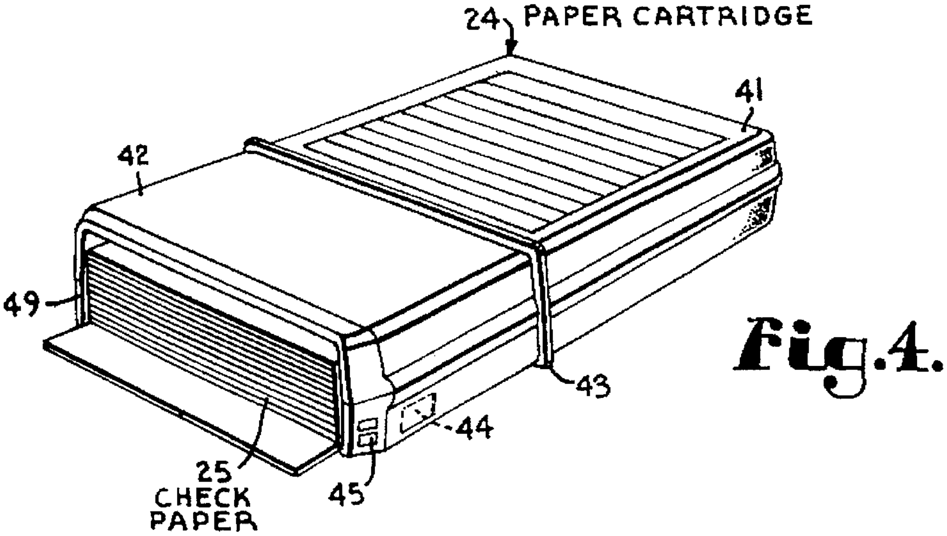
Fig.4.
Fig.7.
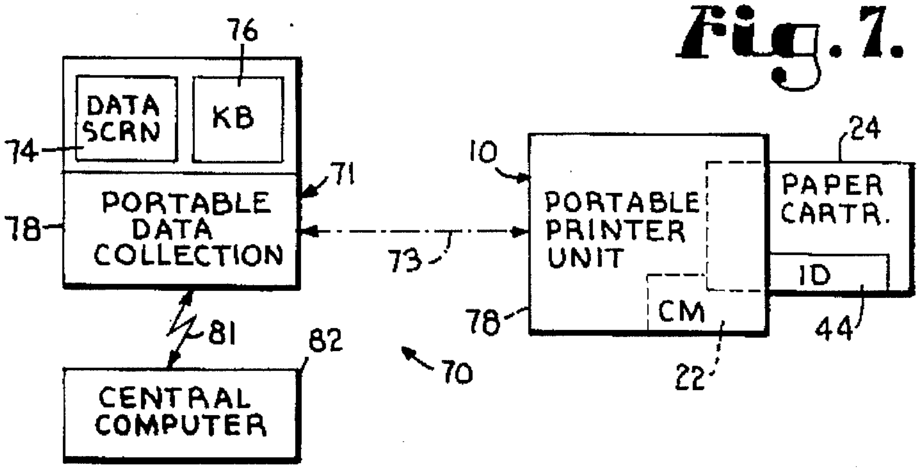

PORTABLE COMPACT MULTI-FUNCTION PRINTER WITH CARTRIDGE PAPER SUPPLY

This is a continuation of co-pending application Ser. No. 08/086,340 filed on Jul. 1, 1993.

BACKGROUND OF THE INVENTION

This invention relates generally to printers and, more particularly, to portable printers which have found use by route delivery persons, route sales representatives, or business or home service persons. Such portable printers may be used to provide customer receipts for various completed transactions. A printer may print a record of merchandise picked up by the service person, or a receipt of an amount paid by, or charged to, the customer for a service performed. Or, the printer may simply provide a confirmation of an order taken for a customer at the customer's business or home.

The usefulness of portable printers has been furthered by efforts resulting in reduced sizes of printers when compared to their respective forerunners. Also, the usefulness of portable printers may be furthered by minimizing tasks by route service people to operate the printers. The present invention seeks to overcome limitations that may be found in present day portable printers.

SUMMARY OF THE INVENTION

It is an object of the invention to provide an improved printer which may be adapted to any one of various specific operations and which is compact in size, so as to be readily ported by a route sales or service person to a customer's location and to be operated to perform a specific, desired task.

It is another more specific object to provide a compact, portable printer which is adapted to print a check including magnetic ink indicia which are standard indicia used by automated check reading apparatus.

It is yet another object of the invention to provide a compact portable printer with the capability of printing validated checks to balance accounts as a result of customer returned goods received by route delivery service people.

A further object of the invention is to provide a portable check printing printer with a security control that minimizes a risk of use of the printer to misappropriate funds for unauthorized purposes.

In accordance with the invention, a portable printer, having a mechanical print head or print generator, a printer control circuit for operating the print generator, a communications circuit for receiving information to be printed and a paper feed drive for advancing paper to a print position, is improved by a supply of magnetic ink coupled to the print generator to cause magnetic characters to be printed which are readable on well known magnetic ink character recognition apparatus.

A portable printer, according to the invention, is characterized as including a magnetic ink character printing capability and a paper supply cartridge with a preselected paper supply cartridge identification which places the portable printer into a check printing mode.

A portable printer, according to the invention, includes a port for insertion of a paper supply cartridge, the port including a cartridge recognition system for identifying the type of paper supply cartridge of a plurality of paper supply cartridges that has been inserted, and to block out a specific operational mode, such as a check writing mode whenever a paper supply cartridge other than an identified check writing cartridge has been inserted into the printer.

A portable printer system for printing checks, according to the invention, includes a paper supply cartridge, a printing module and an information source. The information source may be a portable data collection terminal, also referred to as handheld data terminal, which is communicatively coupled to the printer. A communications link which couples the portable data collection terminal and the portable printer may be a hard-wired link, such as a RS-232 communications link, or the communications link may be a radio frequency transceiver link, each of the portable data collection terminal and the printer including an RF transceiver module. Printable data flow is from the portable data collection terminal to the printer, transmissions from the printer to the data collection terminal including system information and security interaction, such as the generation and transmission of encrypted information to prevent transmitted check printing information from being intercepted and misappropriated.

Security of a printer in check printing operations of a portable check printer system is advantageously furthered by a printer unit which includes a sensing device for sensing the presence of a check printing paper supply cartridge within the printer unit. A communications device for communicatively linking the printer unit to a host terminal includes a device for communicating a configuration type signal from the printer unit to the host terminal. The configuration type signal identifies, for example, to the host terminal the presence of a combination of the printer unit and a preselected cartridge. The host terminal may be a portable data collection terminal, or the host terminal may be a central data processing station. In a configuration in which the host terminal is a central data processing station, a further link may include a portable data processing station as an intermediate station between the host terminal and the printer unit. A circuit to initiate data transfer from the central data processing station via the portable data collection terminal may require a data input signal from the portable data collection terminal to the central data processing station, which data input signal may be a password type data message. In various alternative embodiments within the scope of the invention, the check writing printer is deliberately chosen to be a substantially non-intelligent unit as to the generation and printing of data which may be included on or which may make up a completed check. In this regard, the security of the system protects the pilferage and misuse of funds or information.

Other features and advantages of the invention will become apparent from reading the detailed description below.

BRIEF DESCRIPTION OF THE DRAWINGS

The detailed description of the invention may be read in reference to the appended drawing wherein:

FIG. 1 is a pictorial representation of a printer unit showing features of the present invention including a roll paper supply cartridge;

FIG. 2 is a pictorial representation of the printer unit of FIG. 1, showing a battery pack in relation thereto and showing a sheet paper supply cartridge;

FIG. 3 is a side view of the printer unit of FIGS. 1 and 2, showing a roll paper cartridge and showing a comparative position of a sheet feeder cartridge;

FIG. 4 is a pictorial view of a sheet paper cartridge with sheet paper loaded therein;

FIG. 7 is a schematic diagram showing a data system using the printer unit in accordance herewith.

DETAILED DESCRIPTION OF THE INVENTION

Figure 5:
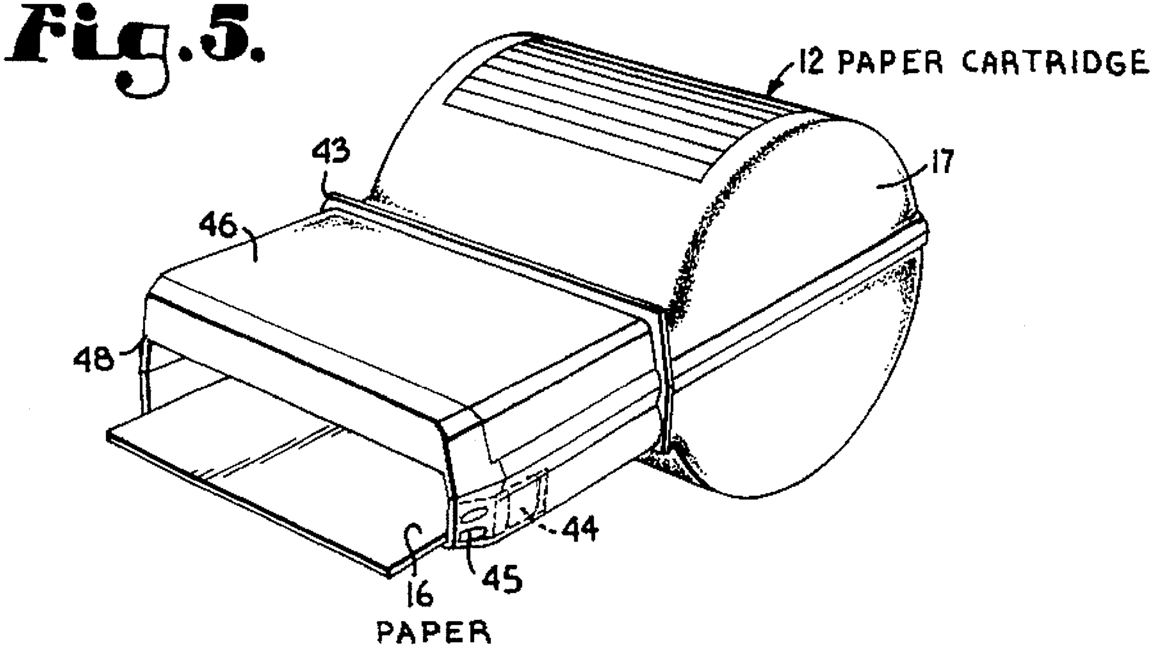
FIG. 5 is a pictorial view of a roll paper cartridge.

Referring to FIG. 1, there is shown pictorially a printer unit 10 in conjunction with a roll paper cartridge 12. A housing 14 of the printer unit 10 is molded of high impact plastic material and features a peripheral rubber molding 15 which is intended to minimize damage to the printer unit 10 should the printer unit 10 be dropped. Operationally, paper 16 is fed from a roll of paper which constitutes a paper supply stock in a barrel-shaped paper supply holder 17 when the paper cartridge 12 is coupled to the printer unit 10. The roll paper cartridge 12 is releasably coupled to the printer unit 10, such that the paper cartridge 12 may be released from the printer unit 10 by an operator pushing a release button 19 which represents part of a cartridge retaining and release mechanism 20 which is located adjacent a paper supply end 21 of the printer unit 10. When the printer unit 10 uses paper fed from the roll paper supply cartridge 12, row or transverse printing may be preferred for most receipt printing applications, though landscape printing may be implemented. Printed characters or symbols may be alphanumeric or may be graphic, such that the printer unit 10 would also have the capability of printing bar code symbols or other identification codes, either with magnetic ink or standard toner inks.

To maintain security with respect to data accessed by the printer unit 10, the printer unit 10 preferably performs no data processing functions other than to generate print symbols in response to received data. It appears, however, that user friendliness of the printer unit 10 may be enhanced without jeopardizing the security of data transferred for printing to the printer unit 10 by providing auto load and auto print functions that are related to the insertion of the cartridge 12 into the printer unit 10, for example. Thus, operating instructions which do not access data as such but which tend to simplify printer operations may be stored within control and memory circuits 22 (see FIG. 3) of the printer unit 10.

FIG. 2 depicts the printer unit 10 with an inserted sheet paper supply cartridge 24. The sheet paper supply cartridge 24 is distinct from the roll paper supply cartridge 12 by its essentially rectangular shape, in contrast to the drum shape of the paper roll holder 17. The sheet paper supply cartridge 24 is contemplated for use with check paper 25, providing for use of the printer unit 10 as a check printer. Capacity of the sheet paper supply cartridge 24 may, for example, be twenty five to fifty sheets of check printing paper 25. The sheet paper supply cartridge 24, when used as a check paper supply and inserted into the printer unit 10, is contemplated to "set" the printer unit 10 to a landscape printing mode. In contrast to other printers which may print certain information pertaining to checks, the printer unit 10, as shown in FIG. 2, is contemplated to print a) a printed form of a check, b) the payee's name, c) the denomination or amount of the check, all in human readable printing 26, and, in addition, magnetic ink characters 27, which are readable by automatic check readers (not shown) conforming to an MICR (Magnetic Ink Character Recognition) standard. These magnetic ink identification characters typically represent routing instructions as well as the denomination or amount of the check. Magnetic ink character readers are used in the banking industry to automatically process and-route checks. Checks may be read to establish routing to an originating bank account, and to read the amount of the check. The check reading process consequently results in the satisfaction of the check writing transaction in that the funds are transferred from the payor's account to the payee. Corresponding magnetic ink character printers to print identifying information on checks are well known in the art, though they are typically implemented as elaborate, stationary check printing apparatus which is found in banking institutions. Though a need for portable check writing equipment has existed for some time in various types of route or mobile operations, drawbacks of a portable check writing device pertain to the control of funds and to security against misappropriation of available check writing funds. The security as well as the fund control concerns are addressed in a check printing system which separates data manipulation from the printing function and which identifies the check paper supply cartridge 24 and the printer unit 10 to a host computer before printing of checks is implemented.

In reference to FIGS. 1 and 2, both self-contained power and external power may be used to power the printer unit 10. A lower portion of the housing 14 of the printer unit 10 shows external power contacts 28 through which the printer unit may be powered without use of a battery pack 29. The battery pack 29 may be a standard rechargeable battery, such as may be used in other portable electronic equipment. The battery pack 29, as a self contained power source of the printer unit 10, is shown in FIG. 2 in a position removed from its normal position attached to an underside 31 of the printer unit 10. Data, including printer control codes as well as printable information, may be communicated via a typical data and power connector 32. Also, external power may be supplied to the printer unit 10 via the data and power connector 32. The data and power connector 32 may be located at a convenient location in the printer housing 14, such at a side of a lower shell 34 thereof. A typical "D-Sub", 9-pin connector 32 is presently preferred, though the type of the communications connector generally would not affect the subject matter of the portable multi-function and check printer unit 10 as disclosed herein.

FIG. 3 shows, somewhat simplified, a side elevation of the printer unit 10, showing a preferred location of the printer control and memory circuits 22, as being disposed centrally within the housing 14 on a printed circuit board 36. The lower shell 34 of the housing 14 also features a molded belt loop 37, which together with feet 38 adjacent the paper feed end 21 of the printer unit 10, allows the printer unit 10 to be placed and used horizontally on a flat surface 39. The paper roll holder 17 is chosen to be of a diameter to also rest against such flat surface 39. The sheet paper supply cartridge 24, on the other hand, would simply project outward away from the paper feed end 21 of the printer unit 10. When the printer unit 10 is carried by an operator on a belt, the printer unit 10 hangs down, with the paper supply cartridges, either 12 or 24, extending downward away from the printer unit 10.

In reference to FIGS. 3 and 4, FIG. 4 shows the sheet paper supply cartridge 24. An outer end 41 of the cartridge 24 would normally extend from the printer unit 10, as shown in FIG. 3. When the cartridge 24 is inserted and locked in position in the printer unit 10, an inner end 42 is disposed within the housing 14 of the printer unit 10. Sheet paper 25, such as the check blanks 25, are exposed at the inner end to be pulled out for printing. Advantageously, a rubber seal 43 will seal off the inner end 42 of the cartridge 24 from moisture or other environmental contaminants. It is desired to at least identify the sheet paper supply cartridge 24, as such, to enable the printer unit 10 to distinguish whether sheet paper or roll paper will be supplied to be printed on. A more elaborate cartridge identification may be desired in route delivery operations in the course of which an operator may have become authorized to use a designated check paper cartridge 24. Electronic identification circuits 44 may be embedded within the cartridges 12 and 24. For example, the identification circuit 44 may be an electrically programmable and electrically erasable ROM device which would permit cartridge information to remain stored therein, even in the absence of an electrical power supply, until the information is intentionally changed by reprogramming. The identification circuit 44 is coupled to external contacts 45 on the cartridge 24. When the cartridge 24 becomes fully inserted into the printer unit 10, the contacts 45 and, hence, the identification circuit 44 become coupled to the printer control and memory circuits 22.

In reference to FIGS. 3 and 5, FIG. 5 shows the roll paper cartridge 12 removed from the printer unit 10. The barrel shaped paper roll holder 17 is set off from an inner end 46 of the cartridge 12 by the rubber seal 43, identical to the rubber seal 43 on the sheet paper supply cartridge 24. The inner end 46 of the roll paper supply cartridge 24 would be the same size and substantially the same shape as the inner end 42 of the sheet paper supply cartridge 12. A mechanical switch 47 may be mounted on the printed circuit board 36 or adjacent thereto and coupled to the control and memory circuits 22 to signal an insertion of the paper supply cartridge 12 or 24. An inner end cap 48 of the roll paper supply cartridge 12 may be adapted to indicate by an activation of the switch 47 that the roll paper supply cartridge 12 has been inserted. Similarly, an inner end cap 49 of the sheet paper supply cartridge 24 may activate the switch 47 to indicate the insertion of the sheet paper supply cartridge 24. Such differential indications can be achieved by a three-position switch 47, having a neutral and first and second activation positions which activation positions are opposite from one another. The end caps 48 and 49 further differ from one another (see FIG. 4) in that the inner end cap 48 is adapted for a feed out of the paper 16 from a roll stock of paper while single sheets need to be fed from the cartridge 24. The mechanical switch 47 is considered a viable identification means alternative to the identification circuit 44. The respective identification circuit 44 coupled to the contacts 45 would, again, identify the cartridge 12 as a roll paper supply cartridge 12. The respective cartridge information may be read by the control and memory circuits 22 when the cartridge 12 is inserted into the printer unit 10. It may be realized that a use of the cartridge information circuit 44, in lieu of a switch, affords the opportunity to supply more information to the printer unit 10, such as cartridge serial numbers and other information that may have been preprogrammed into the cartridge identification circuit 44.

Figure 6:
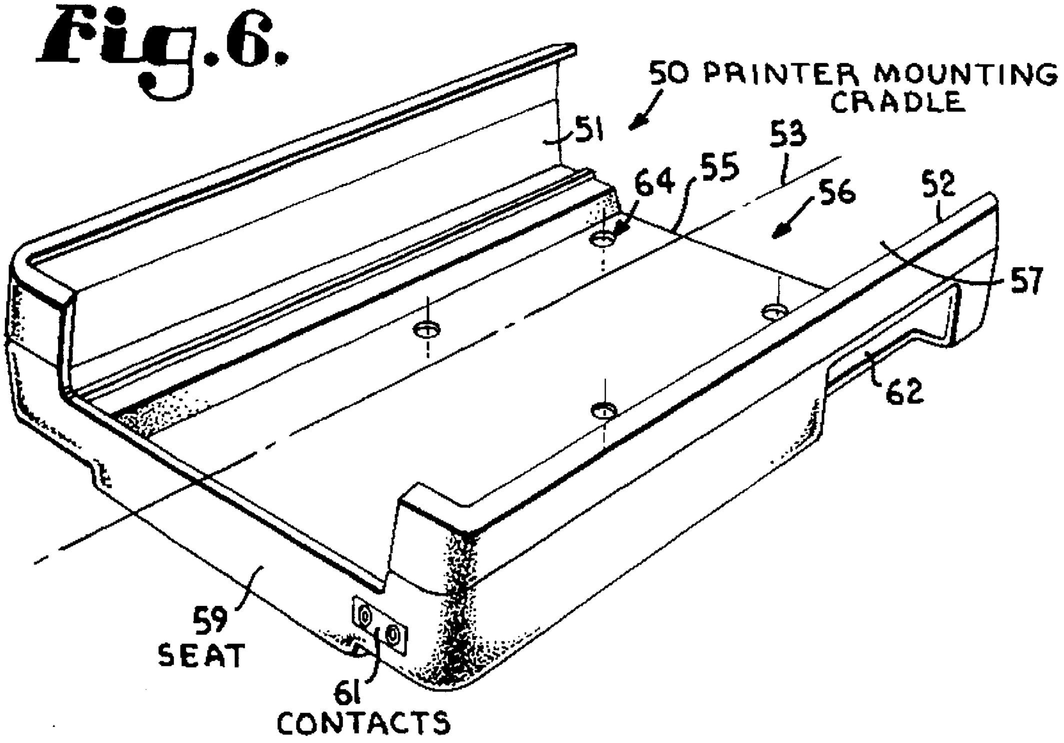
FIG. 6 is a cradle for temporarily holding a printer unit, such as shown in FIGS. 1 and 2.

FIG. 6 shows a printer mounting cradle designated generally by the numeral 50. The mounting cradle 50 has lateral walls 51 and 52, which are substantially mirror images of each other, being disposed symmetrically with respect to a centerline 53 through the printer mounting cradle 50. The lateral walls 51, 52 are spaced apart by a base 55 to form an insertion channel 56. The insertion channel 56 has one open end 57 through which the printer unit 10 may be inserted, leading with an insertion end 58 opposite the paper feed end 21. A seat 59 of the printer mounting cradle 50, opposite the open end 57, stops and locates the printer unit 10 fully inserted within the cradle 50. Contacts 61 are disposed within the seat 59 to become aligned and make contact with the external power contacts 28 of the printer unit 10. A lateral opening 62 corresponds with the location of the power and communications connector 32 of the printer unit 10 when the printer unit 10 is fully inserted within the cradle 50. The cradle 50 may be mounted through a number of spaced, mounting holes 64 to a wall or support bracket within a vehicle (not shown), such as a delivery truck or a fork lift or a sales vehicle, to permit the printer unit 10 to be used with vehicle power connected to the printer unit 10 through the contacts 61. Suitable fasteners for mounting the printer cradle 50 may be metal screws or machines screws (not shown).

FIG. 7 shows schematically a data processing system or data system 70, which includes, particularly, a handheld or portable data collection terminal 71 (PORTABLE DATA COLLECTION) which is shown as being communicatively linked to the printer unit 10, as is indicated by a dashed double-headed arrow 73. A portable data collection terminal 71 is, as a general proposition, a well known information acquisition, information processing and communications device of state of the art business systems. Being portable, an operator carries the data collection terminal 71 to various work sites. Though portable data collection terminals 71 may be "batch terminals", meaning that data are acquired by operators and temporarily stored in memories of the data collection terminals 71 to be transferred via a communications link to a host computer at opportune time intervals; more convenient are portable data collection terminals 71 which include an RF link to a host computer. Digital data message communications via radio frequency transceivers have progressed to a state at which portable data collection terminals 71 are equipped with a transceiver module and have the capability of maintaining a real time link with a central processing station or host computer. As an operator interface, the data collection terminal 71 would typically include a data display screen, such as an LCD screen 74 (DATA SCRN). The data collection terminal 71 may further include an alphanumeric keyboard 76 (KB), though of reduced size and with a minimum number of keys to perform necessary data and control entry functions. Data entry of the data collection terminal 71 may have been further improved by a pen data entry capability and possibly be a code reader for reading merchandise identification tags. The keyboard 76 may feature function keys and cursor keys, and multishift keys permit several functions to be implemented through the same two keys, but in a variation of keystrokes. The portable data collection terminal 71, though portable to be carried by an operator, is, consequently, a complex, microprocessor controlled data processing terminal with communications capabilities.

The printer unit 10 is schematically identified as having inserted therein the sheet feeder supply cartridge 24 (PAPER CARTR.) as an illustrative example of a check printing operation. The communications link may be a serial cable 73 coupled at the printer end to the connector 32, which may be an RS-232 type connection, for example. When the printer unit 10 is carried on a belt of an operator, however, a hard wire communications link 73 between the handheld data collection terminal 71 and the printer unit 10 may be considered inconvenient and cumbersome. It is therefore contemplated to establish an RF communications link 73, by having within the printer unit 10 as well as in the handheld data collection terminal 71, with a short range, low power transceiver unit 78. A preferred location of the transceiver unit 78 within the printer unit 10 is shown, for example, in the lower housing shell 34 adjacent molded belt loop 37 (ref. FIG. 3) and are indicated schematically by underlay boxes 78 in FIG. 7. It is significant to note that the use of a transceiver unit 78 may be preferred for the printer unit 10, even though control code and data to be printed may be transferred solely from the handheld data collection terminal 71 to the printer unit 10. According to one mode of operation, the printer unit 10 initially identifies the type of paper supply cartridge 17 or 24 that is inserted into the printer unit 10. For security purposes, a check paper containing sheet paper supply cartridge 24 may also read a serial number on the sheet paper supply cartridge 24. The printer unit 10 may also have a serial number stored in memory. The serial numbers may be known to the handheld data collection terminal 71, to enable it to scramble or encrypt data messages before the data messages or information to be printed are communicated to the printer unit 10. Such encryption may be particularly desirable when the data messages are transmitted by radio frequency over the transceiver units 78. If the handheld data collection terminal 71 is not informed about the serial numbers or scrambling code of the printer unit 10, the handheld data collection terminal 71 may interrogate the printer unit 10 regarding the serial number to be used for scrambling data messages sent to the printer unit 10 to print checks. A secured data communications link 73 includes, therefore, a bi-directional communications link 73 and an encoding and decoding provision which would in part be disposed within the portable data collection terminal 71 and, in part, it would be disposed in the control and memory circuits 22 of the printer unit 10. Encoding and decoding may be done pursuant to communications software which is part of the data system 70. The data collection terminal 71 is, like typical data collection terminals, a microprocessor controlled data collection terminal and is provided with sufficient memory to perform encoding and decoding of data messages in addition to other, more routine data acquisition and data communications operations. The control and memory circuits 22 of the printer unit 10 may also be typical microprocessor controlled circuits. In the alternative, the control and memory circuits 22 may be application specific and non-alterable. Nevertheless, the circuits 22 must be compatible with any communications program of the data collection terminal 71.

Data messages received either by a hard wired cable through the connector 32 (see FIG. 3) or via the transceiver 78 are decoded by the printer control and memory circuit 22, and a printer subassembly or printer module 79 is directed to print, for example, a check in accordance with the data received in the respective print data message by the printer unit 10. The printer module 79, in contrast to known compact printer modules, includes a magnetic ink character generator and magnetic ink supply. The magnetic character generator has the capability of forming on a check form at least one character line in magnetic ink, which character line provides the printed check with the desired routing information. Known ink jet, thermal transfer, laser printing or offset print technology may be applied in connection with the deposition of magnetically readable check routing ink. A platen and paper advance mechanism 80 advances the check paper 25 past a respective print station within the printer module 79.

In another embodiment, the handheld data collection terminal 71 may be an intermediate unit, with an additional communications link 81 existing between the handheld data collection terminal 71 and a central computer or host computer 82. In this latter embodiment, funds for check writing operations by the printer unit 10 may be controlled by the central computer 82, based on information communicated by the data collection terminal 71 to the central computer 82.

Pursuant to the data system 70 as depicted in FIG. 7, the handheld data collection terminal 71 would be a preferred device for actually controlling printing operations of the printer unit 10. If an operator would want to issue a check, pertinent data for making out the check would be entered into the handheld data collection terminal 71. The data may then be scrambled in accordance with security scrambling codes received from the printer unit 10. Thereafter, information for printing the check would be transmitted to the printer unit 10 via the communications link 73 using a data cable or mutually communicating transceiver units 78 located, respectively, in the handheld data collection terminal 71 and in the printer unit 10. The communications link 73 between the data collection terminal 71 and the printer unit 10 may also be set up such that a cable 73 coupled between the units 71 and 10 becomes a primary communications link. In the absence of a cable connection for establishing the communications link 73, or when a communications cable connection becomes disconnected, it is contemplated that the low power transceiver units 78 located in the handheld data collection terminal 71 and in the printer unit 10 take over and take the place of the cable in communicating between the two units 10 and 71. Scrambling of check-producing data messages may be helpful not only to minimize an intentional misappropriation of check writing information, such as a graphic representation of a signature, for example, but, also, to avoid an accidental misdirection of check writing data messages to another printer unit 10 which may be operational in the vicinity of the prime printer unit 10 to which the scrambled data message is directed.

Another embodiment contemplates the connection of the printer unit 10 to a data supplying terminal which is not equipped with a described low power transceiver unit 78. In such case, the data messages would need to be transmitted via a cable of a data link 73. In addition, the printer unit 10 may be linked to a second data terminal, such as the data collection terminal 71, which is equipped with a transceiver unit 78 by establishing a data link via the respective transceiver units 78. According to this latter arrangement the printer unit 10 would be a shared printer unit 10 capable of meeting the printing needs of the two data collection terminals 71.

Though certain variations and modifications have already been referred to or described, it is understood various other changes, and modifications in the use and implementation of the described embodiments, are possible without departing from the spirit and scope of the invention as set forth in the claims.

We claim:

1. A data system comprising:

a portable printer unit including means for printing a document with a unit of check information readable by check routing equipment to satisfy a check writing transaction, means for releasably receiving a paper cartridge of a type of cartridge selected from roll paper and sheet paper cartridges, and cartridge identification means for receiving information as to the type of cartridge received by the portable printer unit;

a paper cartridge inserted into and releasably received by the portable printer unit, the paper cartridge including a cartridge identifying means containing information as to the type of cartridge inserted into and releasably received by the portable printer unit for providing such cartridge identifying information to the cartridge identification means upon receipt of the cartridge by the portable printer unit;

a data collection terminal;

means for communicatively coupling the portable printer unit to the data collection terminal such that data messages are communicatable between the portable printer unit and the data collection terminal, the data messages including printing control codes, printable information and cartridge identifying information; and means, disposed at the data collection terminal and at the portable printer unit, for scrambling data messages including the unit of check information readable by check routing equipment to be communicated from the data collection terminal to the portable printer unit at the data collection terminal and for descrambling data messages including the unit of check information readable by check routing equipment communicated from the data collection terminal to the portable printer unit at the portable printer unit.

2. The data system according to claim 1, wherein cartridge identification means of the portable printer unit comprises a control and memory circuit means, and the cartridge identifying information provided by the inserted paper cartridge to the portable printer unit is received within the memory circuit means.

3. The data system according to claim 2, wherein the portable printer unit comprises means for communicating cartridge identifying information to the data collection terminal, whereby the data collection terminal becomes enabled to use communicated cartridge identifying information for scrambling the data messages to be communicated to the portable printer unit.

4. The data system according to claim 3, wherein the means for communicating data messages comprises first and second radio frequency transceivers disposed at the portable printer unit and the data collection terminal, respectively, and a host computer is further communicatively coupled to the data collection terminal, the data system further comprising means for initiating check printing operations by the portable printer unit based on identification of the paper cartridge inserted into the portable printer and the data collection terminal.

* * * * *